United States Patent
Maystrovsky et al.

[11] Patent Number: 5,850,535
[45] Date of Patent: *Dec. 15, 1998

[54] ROLL-BACK DURING REGENERATION ON A COMPUTER-AIDED DESIGN SYSTEM

[75] Inventors: Gennady D. Maystrovsky, Brookline; Timothy Friedman, Lexington, both of Mass.

[73] Assignee: Computervision Corporation, Bedford, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 542,453

[22] Filed: Oct. 12, 1995

[51] Int. Cl.⁶ .............................. G06F 17/50; G06F 17/30
[52] U.S. Cl. ..................... 395/500; 345/433; 345/418; 345/420
[58] Field of Search .................... 395/500, 600, 395/160, 356, 613, 616, 919; 364/300, 192; 345/418, 326, 433, 420

[56] References Cited

U.S. PATENT DOCUMENTS

| | | | |
|---|---|---|---|
| 4,864,497 | 9/1989 | Lowry et al. ............. | 707/102 |
| 5,019,961 | 5/1991 | Addesso et al. .......... | 364/192 |
| 5,287,501 | 2/1994 | Lomet ...................... | 707/202 |
| 5,479,601 | 12/1995 | Matheny et al. ......... | 345/326 |
| 5,517,607 | 5/1996 | Nishimura et al. ...... | 345/356 |
| 5,535,386 | 7/1996 | Wang ........................ | 707/203 |
| 5,606,651 | 2/1997 | Brown et al. ............. | 345/433 |

FOREIGN PATENT DOCUMENTS 2 636 753-A1  3/1990  France ..................... G06F 15/72

OTHER PUBLICATIONS

Kefer, W. et al: "Mapping a Version Model to a Complex–Object Data Model"; 1992, pp. 348–357:Eighth International Conference on Data Engineering (Cat. No. 92CH3097–3).

Blin, M. et al., A Model of Configurations For Hardware/Software System Deliveries: 1992: pp. 795–806: 5th International Conf., Software Engineering and Its Applications Proceedings, Toulouse, France.

Toriya, H. et al.; "Undo and Redo Operations For Solid Modeling", April 1986, pp. 35–42: IEEE Computer Graphics and Applications, vol. 6, No.4.

European Search Report for EP 96 40 1889, dated Jan. 29, 1998.

*Primary Examiner*—Kevin J. Teska
*Assistant Examiner*—Vuthe Siek
*Attorney, Agent, or Firm*—Wolf, Greenfield & Sacks, P.C.

[57] ABSTRACT

A method and apparatus that keeps information on all entities that are created when a model is built in a CAD system, including an indication of which command causes each entity to be added to or taken from the model. From this information, the system can determine the state of the model at any given time during its creation, without having to regenerate commands that generated the model at the determined state. For each new command, only those entities that are newly created are added to the database. The entities each have a version field that allows the same data to relate to different versions of the model.

23 Claims, 9 Drawing Sheets

| TAG | ACTIVATION | DEACTIVATION |
|---|---|---|
| f1 | 1 | 3 |
| f2 | 1 | — |
| f3 | 1 | 3 |
| f4 | 1 | 4 |
| f5 | 1 | 4 |
| f6 | 1 | 4 |
| f7 | 3 | 4 |
| f8 | 3 | 4 |
| f9 | 4 | — |
| f10 | 4 | — |
| f11 | 4 | — |
| f12 | 4 | — |
| f13 | 4 | — |
| f14 | 4 | — |
| f15 | 4 | — |

ROLL-BACK DURING REGENERATION ON A COMPUTER-AIDED DESIGN SYSTEM

FIELD OF THE INVENTION

This invention relates to creating entities and regenerating models in a computer-aided design (CAD) system.

BACKGROUND OF THE INVENTION

A computer-aided design (CAD) system is a tool that allows a user to create models on a computer system. The user builds a model with a series of commands that perform tasks that instruct the CAD system to produce model entities such as solids, curves, or lines; form contours; and define dimensions. Typical models are made through the execution of hundreds or even thousands of such commands.

In conventional systems, when a user enters commands, a geometric modeler receives the commands and generates entities based on a set of rules defined in application code. These entities, such as solids and portions of solids including faces and edges, are created as data stored in a database. The entities include tags that have a number of fields, including an entity number, data that interrelates the entity to other entities, and other useful information. Each time a command is entered, the geometric modeler typically creates a new set of entities and stores them in the database.

When a new command changes a previously created entity, CAD systems currently in use, such as the CADDS line available from Computervision Corp. in Bedford, Mass., typically delete some or all of the previous entities and replace the deleted entities with new entities. This replacement is done because storing data for all the new and old entities for each command would quickly use up prohibitively large amounts of storage.

After a number of commands have been entered, a designer may decide to alter one or more of the previous commands. For example, a designer may want to make a radius of a particular cylinder larger or smaller, or to change an angle of a chamfer. Early CAD systems captured keystrokes entered by the user, and allowed the user to edit and re-run an earlier sequence of commands. Such a system required the user, often a design engineer, to locate the dimension or property to be changed in the command list, and to function as a programmer in editing the sequence.

A system of parameterization and regeneration has also been developed. With this system, a user can designate, typically with a mouse, a portion of a model to be altered. The user can then enter a modification to alter or eliminate an entity in the model, or to undo a command. For example, a designer could point to a circular opening in a cube, and change the radius to enlarge the opening. Conventional parametrerization systems regenerate at least some of the commands that were entered prior to the command that the designer wants to modify. If, for example, a designer entered commands numbered one through fifty and then wanted to change the radius of a cylinder created in command number thirty-five, some or all of the thirty-four commands leading up to command number fifty would be regenerated, which can take up a substantial amount of time.

After a model is regenerated in a conventional system, a user is allowed to choose between the original model and the regenerated model. When one of the original model and the regenerated model is chosen, the other is typically discarded to prevent excessive storage of data.

SUMMARY OF THE INVENTION

In one illustrative embodiment of the invention, a method is provided for updating a first version of a model in a CAD system in response to a request to regenerate the model with a modification to generate a second version of the model. The CAD system includes a computer and a database, and creates model entities in response to input commands. The first version of the model includes a plurality of model entities created during the execution of a sequence of input commands. The request to regenerate the model identifies at least one modified input command, corresponding to an input command in the sequence that is modified to define the modification to the first version of the model. In accordance with the illustrative embodiment, the method includes the computer implemented steps of: (a) storing in the database the plurality of model entities of the first version of the model created by the input commands in the sequence; (b) storing identification information for each model entity that identifies at what stage in the sequence of commands the entity was included in the first version of the model; (c) when the request to regenerate the model is received, identifying model entities that were included in the first version of the model following execution of an input command in the sequence that immediately precedes the input command corresponding to the modified input command; (d) retrieving the identified model entities from the database to be included in the second version of the model; and (e) executing the modified input command and each input command that follows it in the sequence to create additional model entities that complete the second version of the model.

In another illustrative embodiment of the invention, a method is provided for storing multiple versions of a model in a CAD system, the CAD system storing at least first and second versions of the model, the at least first and second versions of the model each including a plurality of model entities, the CAD system including a computer having a database. The method includes the computer implemented steps of: (a) storing in the database each of the plurality of model entities included in the first version of the model; (b) identifying a first group of model entities included in the second version of the model that are also included in the first version of the model, and a second group of model entities in the second version of the model that are not included in the first version of the model; (c) storing in the database each of the plurality of model entities included in the second group; and (d) storing in the database information identifying each of the stored model entities included in the first version of the model as belonging to the first version, identifying each of the model entities in the first group as also belonging to the second version of the model, and identifying each of the model entities in the second group as belonging to the second version of the model.

In a further illustrative embodiment of the invention, a method is provided for updating an original version of a model in a CAD system in response to a request to regenerate the model with a modification to generate a regenerated version of the model. The CAD system creates model entities in response to input commands. The original version of the model includes a plurality of model entities created during the execution of a plurality of input commands received in a sequence, the request to regenerate the model identifying at least one modified input command, the at least one modified input command corresponding to an input command in the sequence that is modified to define the modification to the model. The original version of the model has a plurality of states corresponding to the plurality of input commands received in the sequence, such that the original version of the model has a unique state following the execution of each of the plurality of input commands, each state of the model including at least one model entity. The illustrative method including the computer implemented steps of: (a) storing in the database the plurality of model entities of the original version of the model created by the plurality of input commands in the sequence; (b) storing information identifying each of the plurality of states of the model; (c) when the request to regenerate the model is received, identifying the at least one model entity that was included in the state of the original version of the model following execution of an input command in the sequence that immediately precedes the input command corresponding to the modified input command; (d) retrieving the at least one model entity identified in step (c) from the database to be included in the regenerated version of the model; and (e) executing the modified input command and each input command that follows it in the sequence to create additional model entities that complete the regenerated version of the model.

In yet another illustrative embodiment of the invention, a CAD system is provided that generates model entities in response to received input commands, the CAD system responding to a sequence of input commands to generate an original version of a model that includes a plurality of model entities, the CAD system also responding to a regenerate command to generate a regenerated version of the model. The regenerated version of the model includes a plurality of model entities. The regenerate command identifies at least one modified input command that corresponds to an input command in the sequence that is modified to define a modification to the original version of the model. In accordance with the illustrative embodiment, the CAD system includes a database; means for storing in the database the plurality of model entities of the original version generated in response to receipt of each input command in the sequence; means for storing identification information in the database for each of the plurality of model entities of the original version that identifies at what stage in the sequence of commands the model entity was included in the original version of the model; identification means, responsive to receipt of the regenerate command, for identifying model entities that were included in the original version of the model following execution of an input command in the sequence that immediately precedes the input command corresponding to the modified input command; means, responsive to the identification means, for retrieving the identified model entities from database; means for executing the modified input command and each input command that follows it in the sequence to create regenerated model entities; and means for combining the retrieved model entities and the regenerated model entities to generate the regenerated version of the model.

In a further illustrative embodiment, a CAD system is provided that generates model entities in response to received input commands, the CAD system responding to input commands to generate an original version of a model that includes a plurality of model entities, the CAD system also responding to a regenerate command to generate a regenerated version of the model that also includes a plurality of model entities. In accordance with the illustrative embodiment, the CAD system includes a database; means for storing in the database each of the plurality of model entities included in the first version of the model; means for identifying a first group of model entities included in the regenerated version of the model that are also included in the original version of the model, and a second group of model entities in the regenerated version of the model that are not included in the original version of the model; means for storing in the memory each of the plurality of model entities included in the second group; and means for storing in the memory information identifying each of the model entities included in the original version of the model as corresponding to the original version, identifying each of the model entities in the first group as also corresponding to the regenerated version of the model, and identifying each of the model entities in the second group as corresponding to the regenerated version of the model.

BRIEF DESCRIPTION OF THE DRAWINGS

Other features and advantages will become apparent from the following detailed description and from the drawings, in which.

DETAILED DESCRIPTION

In a CAD system according to the present invention, when new commands are entered, newly created entities are added to the database while old entities, rather than being deleted, are kept but identified as suspended or deactivated. Each entity is preferably provided with an activation field indicating when the entity was activated, and a deactivation field indicating if or when the entity was deactivated. From this information, the system can determine the state of the model at the time of any given command. Consequently, all commands leading up to a command that is to be altered do not have to be regenerated, but rather, only those commands which occurred after the altered command.

In one embodiment of the invention, information is maintained that indicates when each entity in a model is activated or deactivated. By saving this activation information, the system and the user can identify the state of a model at a point after any given command by finding all the entities which were both activated and not deactivated prior to the given command. Thus, the system does not need to regenerate commands leading up to a command which is to be changed. This feature can lead to substantial savings in time, especially when a command with a high number relative to the total number of commands is altered or undone.

Unlike previous systems in which each successive command causes new entities to be created and old entities to be discarded, the present invention keeps entities that are unchanged, stores deactivated entities with a deactivation field indicating when they were deactivated, and creates new entities in response to the new command. In this way, the state of the model can easily and quickly be determined after any given command.

In accordance with another embodiment of the invention, multiple versions of a model, including regenerated versions, are maintained. The entities have one or more version fields that reference different versions of a model so that one entity may refer to several different versions. After several versions of a model have been created, a user can select which of the versions to keep. This feature also allows for greater storage of models without prohibitive storage requirements.

Figure 1:
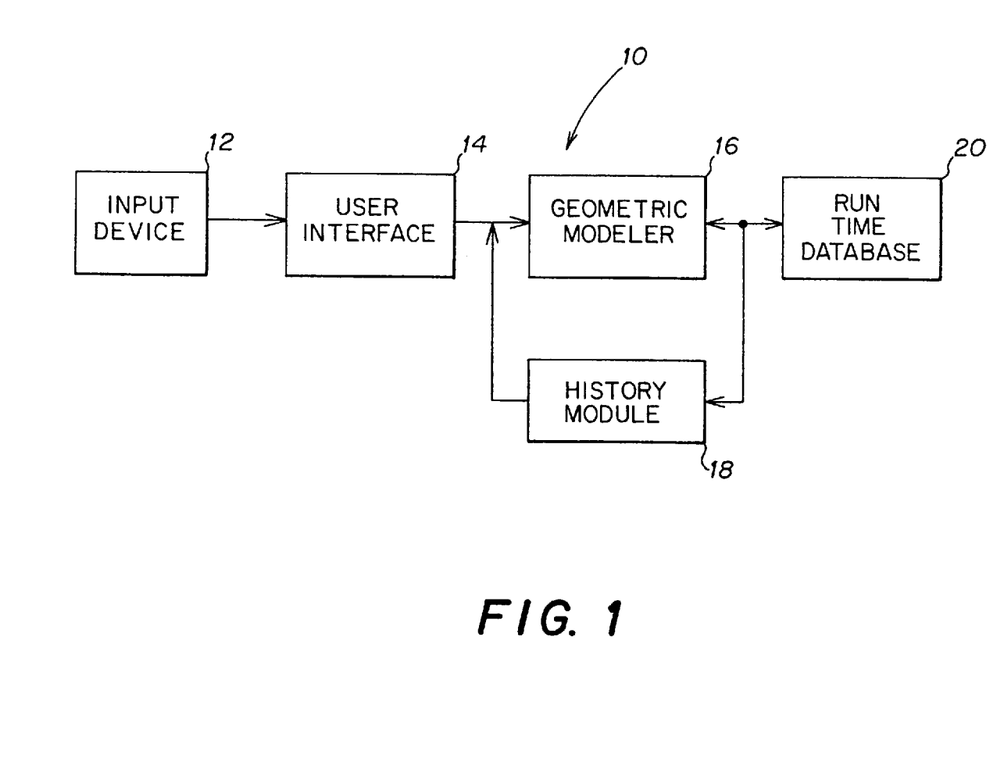
FIG. 1 is a block diagram of a CAD system according to the present invention.

Referring to FIG. 1, a CAD system 10 has a user interface 14 that receives user-entered commands from an input device 12, such as a mouse, keyboard, track ball, touch sensitive screen, track pad, or any other input device that allows a user to enter information. The user-entered commands are provided from interface 14 to a geometric modeler 16. Modeler 16 receives the commands and calls routines in application code (not shown) that generates model entities, such as faces and edges, based on the user-entered commands. Information about each entity is stored as a "tag" for the entity. A current state of a model created on the system is maintained in a run-time database 20, which holds all entities that have been not deactivated or otherwise superseded by later commands.

A list of received commands and a hierarchical tree structure of the resulting model are maintained in a history module 18. If a user makes changes to the model so that regeneration is necessary, commands that are to be regenerated are provided to modeler 16 from the list of commands kept in history module 18. History module 18 thus serves as a source of inputs during model regeneration.

Modeler 16, history module 18, and database 20 are implemented by a combination of processing hardware and software. The processing hardware may be a workstation, such as a Sun Microsystems Sparc 10. The hardware system should include a user interface (e.g., a keyboard and a mouse), one or more processors, a visual display, and either large scale storage or access to such storage (e.g., over a network of computers). The system may be used with the X-windows operating system, also available from Sun Microsystems.

Figure 2:
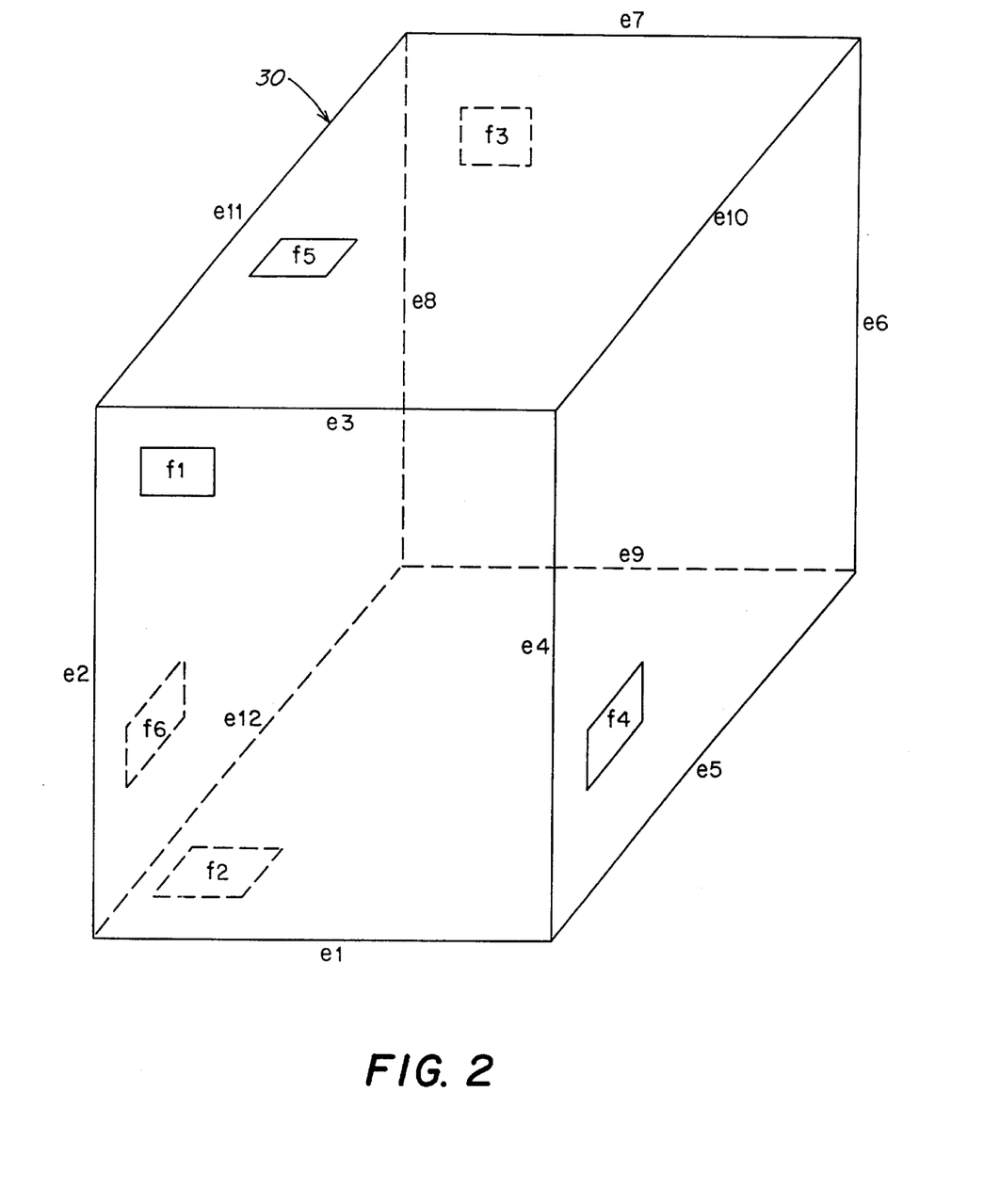
FIGS. 2–4 are perspective views of an example of a model that can be generated by a CAD system according to the present invention.
Figure 3:
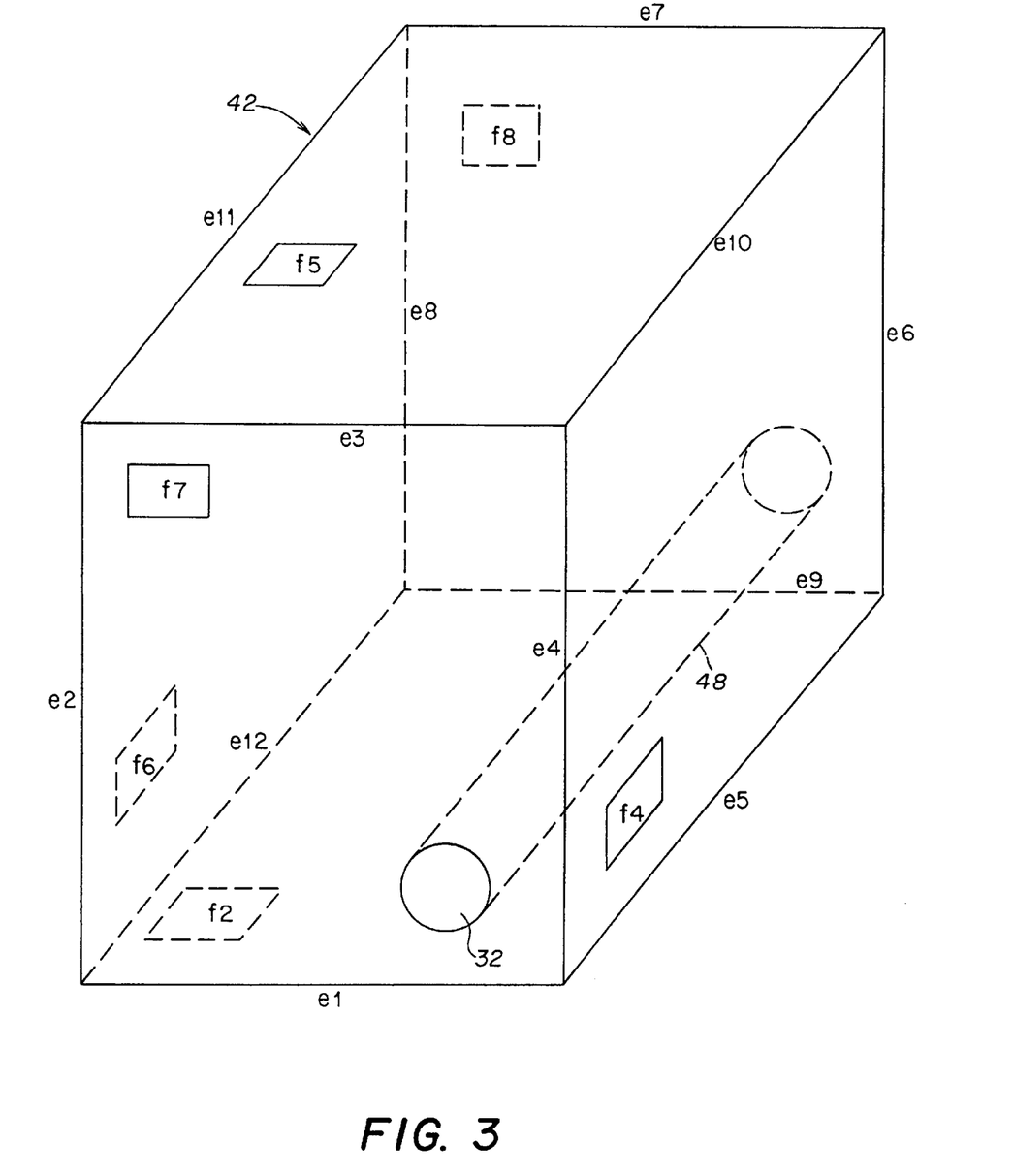
Figure 4:
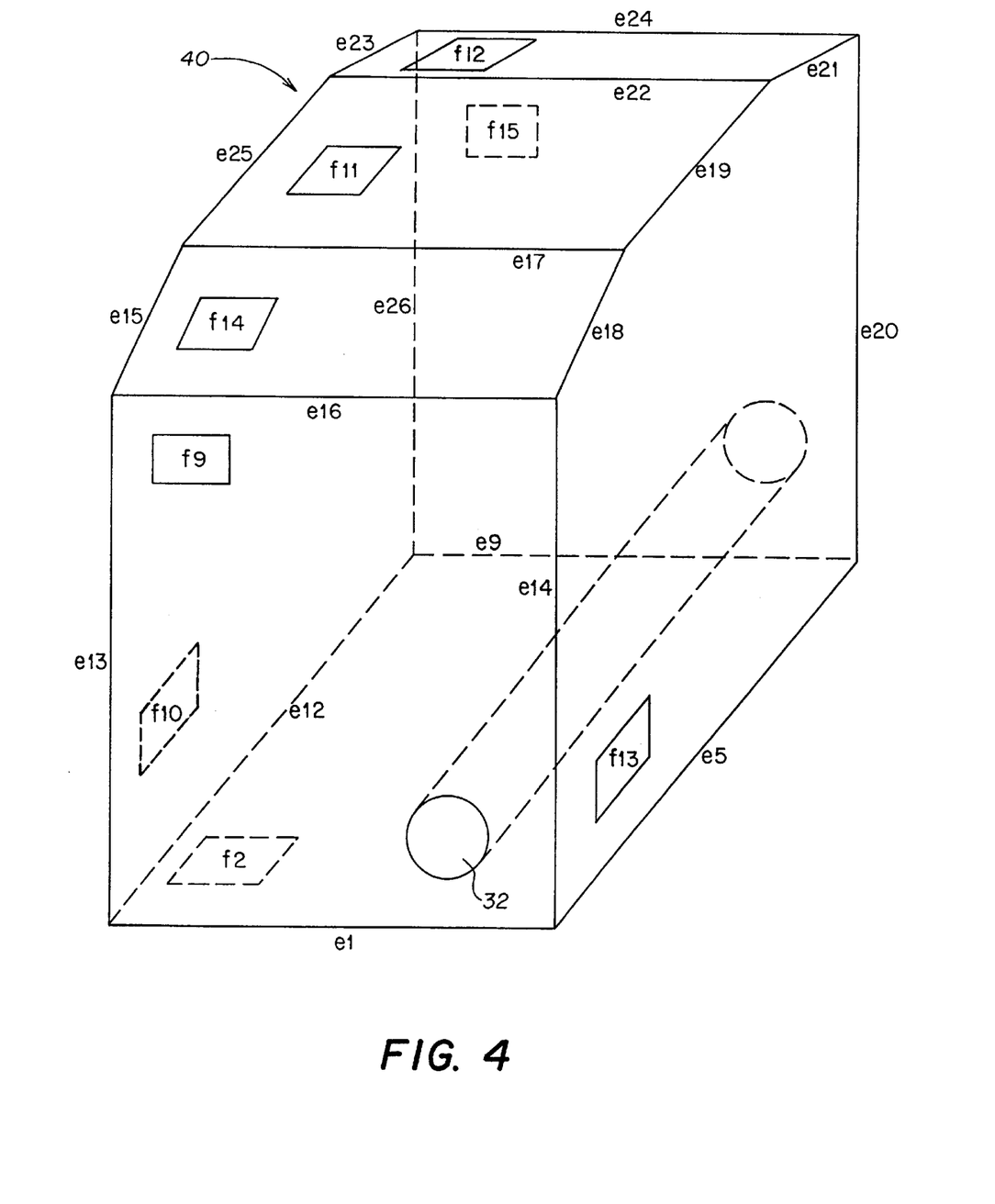

Referring to FIGS. 2–4, a simple example of a model is provided for illustrative purposes. In this example, a user enters a command to create a box 30 (command one). The geometric modeler 16 (FIG. 1) receives the command in a simplified command language and calls a routine in application code that creates twelve edges, six faces, and eight vertices. In FIG. 2, edges are represented as eI (wherein I is an integer from 1–12), and faces are represented as fM (where M is an integer from 1–6), while vertices are not separately identified for convenience.

Referring particularly to FIG. 3, a user next creates a cylinder 48 by executing command two, and removes the cylinder from box 30 by executing command three. This results in the creation of a bore 32 extending between what was previously faces f1 and f3. It should be understood that the CAD system may have different command terminology to accomplish this task, e.g., commands two and three might be replaced with a command such as "make hole" or "drill hole". The execution of command three results in the modification of faces f1 and f3, which are deactivated and replaced with new faces f7 and f8 on box 30. In addition, the execution of command three results in the creation of new faces and edges (not separately identified for convenience) for representing bore 32.

As noted above, in conventional CAD systems, a new set of entities and corresponding numbered tags that identify the faces and edges would be created after each command is executed, even though not all of the edges of the box 30 are changed, and only faces f1 and f3 of the box were altered by the formation of bore 32.

FIG. 4 illustrates another change made to the model by the execution of a command four, which is a chamfer command that causes edges e3 and e7 to be chamfered, thus modifying face f7 to create new faces f9 and f14, modifying face f8 to create new faces f12 and f15, modifying face f5 to create new face f11, and modifying faces f4 and f6 to respectively create new faces f13 and f10. Thus, all of the faces in solid 42 of FIG. 3 are altered by command four, with the exception of face f2. Edges e1, e5, e9, and e12 are unchanged, while new edges e13–e26 are created.

Figure 5:
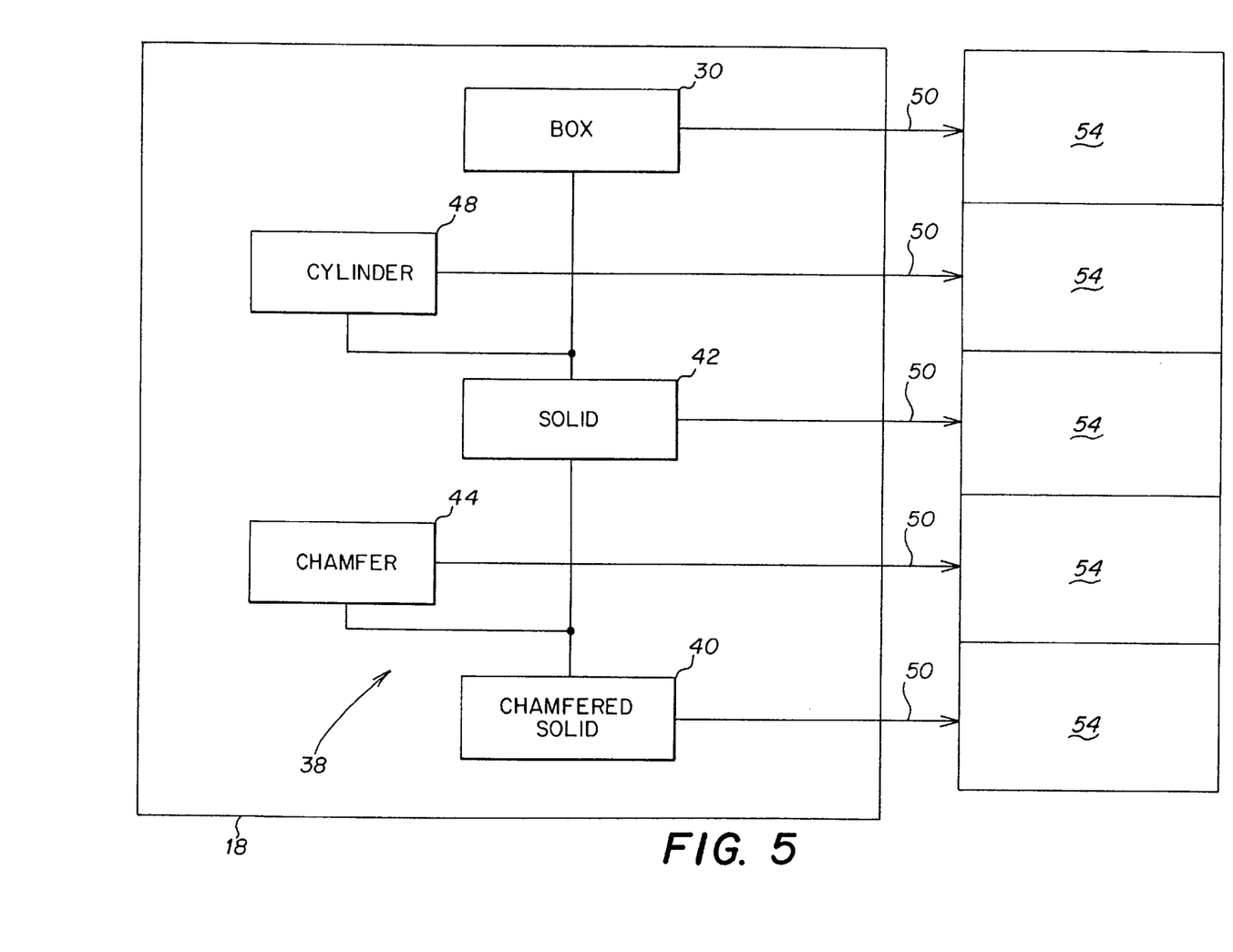
FIG. 5 is a block diagram illustrating a tree structure stored in history for the example of FIGS. 2–4.

FIG. 5 represents a history module 18 that would be created by the above-described execution of commands one through four. The history module stores a hierarchical tree structure 38 that relates the model entities. Chamfered solid 40 represents the structure of FIG. 4, created by command four. Chamfered solid 40 depends on solid 42, and a chamfer 44. Solid 42 represents the structure of FIG. 3, created by commands one through three, and results from a box 30 created by command one, and a cylinder 48 removed from the box in command three. Each of the entries in tree 38 has a pointer 50 that points to a location 54 in database 22, where the faces, edges, and vertices that form the model are stored. The history module also contains the commands (not shown) that were entered by the user to create each of the model entities.

A designer may decide to further modify the design, for example, by increasing the radius and thereby enlarging the bore 32. In conventional systems, since the bore was formed by creating cylinder 48 and subtracting it from box 30, the box and the cylinder would be regenerated to implement the design modification. Consequently, such a system would regenerate command one to recreate the box.

Other changes to the model that a designer may decide to make, rather than changing the cylinder radius, might be to chamfer different edges, change the size or angle of the chamfer, or undo the chamfer. As noted above, some prior art systems would have to recreate commands two and three to effect such changes, even though the cylindrical bore 32 has no relation to the chamfers, and would not be altered by modifications to the chamfers.

As stated above, in a CAD system according to the present invention, the state of the model after execution of each command is maintained through the tag information stored in the database. Thus, if a change was made to the model of FIG. 4 by changing the chamfer on a CAD system of the present invention, the chamfer can be redone or undone by regenerating only the chamfer command. To accomplish this, when tags that correspond to the model entities are created and stored, each includes an activation field that indicates when its corresponding entity was created, and a deactivation field that indicates if or when the entity was deactivated. For the simplified box example of FIG. 2, each of the entities (i.e., the faces, edges and vertices) has an indication in its respective activation field that it was created by command one, the create box command. As a result of the execution of commands two and three, faces f1 and f3 are replaced with faces f7 and f8. Therefore, replaced faces f1 and f3 have information in their respective fields indicating deactivation at command three, but those entities are saved for potential future use. Faces f7 and f8 have information in their respective activation fields indicating that they were created by command three. Since the other faces and edges are unaffected by subtracting the cylinder from the box, they are left unchanged. Furthermore, all original edges remain unchanged, while new edges (not separately identified) are created around bore 32.

Figure 6:
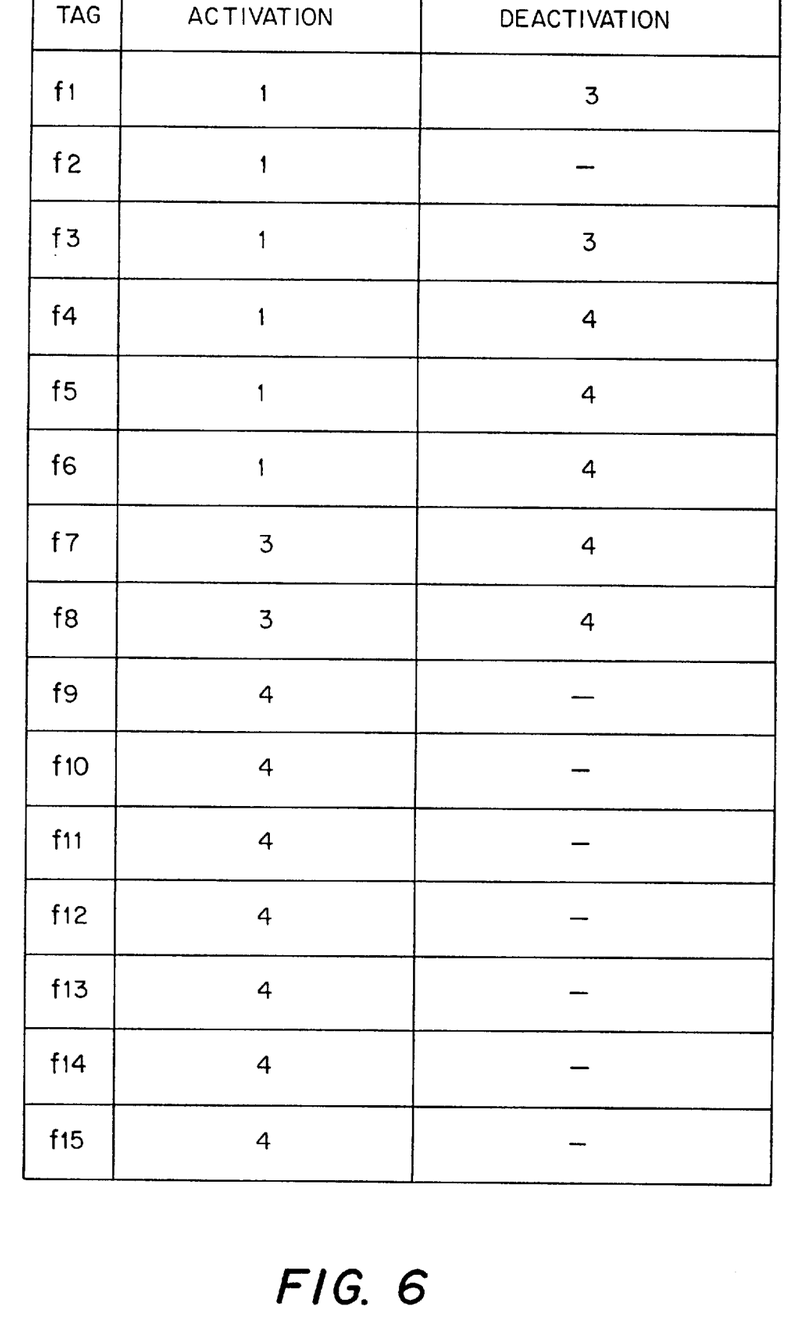
FIG. 6 is a table illustrating how certain data is kept according to the present invention.

Referring to FIG. 6, the tags for faces f1–f15, at a point in time following the execution of command four, are stored in a table that indicates when all the faces were activated, and if and when they were deactivated. The existing faces after command four are those that have no deactivation indication. It should be understood that the tags for edges e1–e26 are stored in the same manner.

The hardware on which the CAD system of the present invention is implemented has a processor, which may be any of a number of standard processors, that executes a software routine to search the table of tags of FIG. 6 to determine which entities were in existence for any state of the model. For example, to determine which entities were in existence after command three but before command four, the system checks all entities that indicate a command number of three or less in the activation column, and a deactivation command number of four or more (or no deactivation). This principal can be generalized by stating that the entities in existence after an I-th command will be those which have an activation number of I or less, and a deactivation number greater than I (where an entity that has not been deactivated is considered to have an infinite deactivation number).

Figure 7:
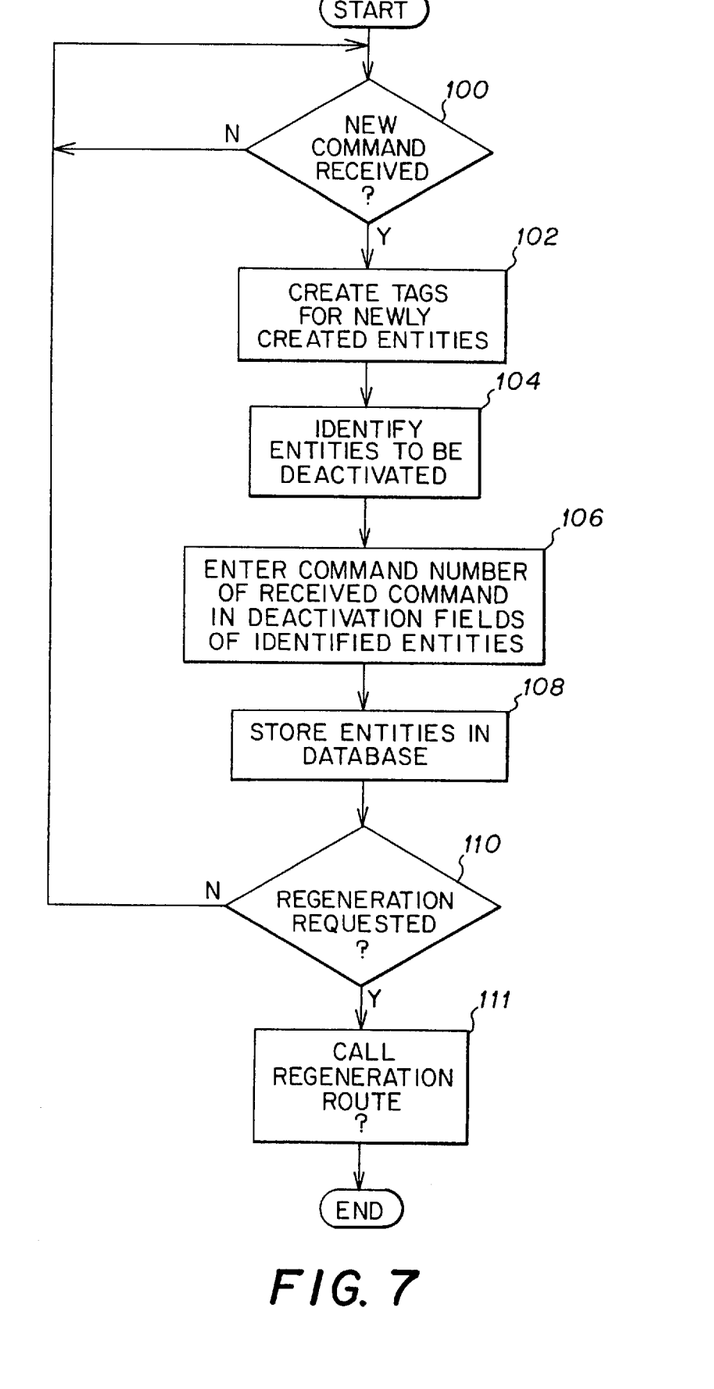
FIG. 7 is a flow chart illustrating a tag updating method according to the present invention.

A CAD system of the present invention includes a software routine, operating on the hardware, that implements a process to determine the entities in existence after a specified command. The software routine is represented in the flowchart of FIG. 7. As a designer is creating a model, a sequence of commands is received by the system successively. In step 100, the method continually checks to determine when a new command has been received, the new command having a command number N indicating its position in the sequence of received commands. When a new command N is received, the method proceeds to step 102, wherein the geometric modeller creates tags for the new entities created by the newly received command, and provides the command number N in the activation fields of the newly created tags. The method then proceeds to step 104, wherein the entities to be deactivated are identified. For each entity that is to be deactivated, the command number N of the command received in step 100 is entered in its deactivation field in step 106. Each of the entities are then stored in the database 20 (FIG. 1) in step 108.

Figure 8:
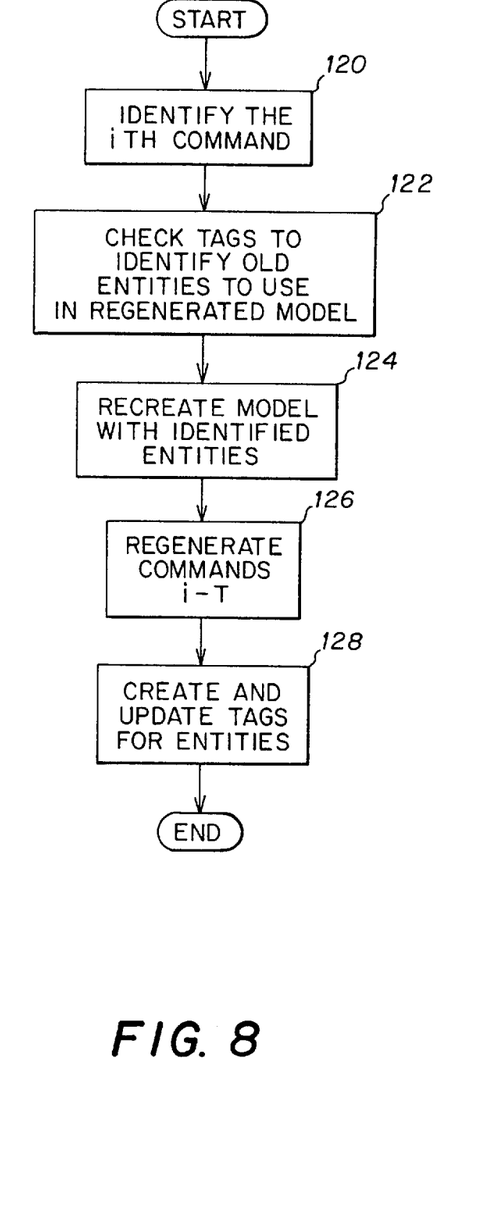
FIG. 8 is a flowchart illustrating a regeneration method of the present invention.

After one or more commands have been received, the user has the option of issuing a command to regenerate the model. Thus, in step 110, a determination is made as to whether the command received in step 100 requested regeneration, and when it did not, the method returns to step 100 to await receipt of a next command. In this manner, the method proceeds through steps 100–110, updating tags for model entities in the manner discussed above for each received command, until it is determined at step 110 that regeneration has been requested. When this determination is made, the method proceeds to step 111, wherein the regeneration routine of FIG. 8 is called, and then the method terminates.

The user command to regenerate the model includes an indication of a modified command. That command is identified in the routine of FIG. 8 by its command number I. Command number I is less than or equal to T, wherein T represents the total number of commands executed in the generating the model. Initially, in step 120, the I-th command is identified, and then the method proceeds to step 122, wherein the data storing the tags for the model entities is checked to determine which pre-existing entities should be included in the model to be regenerated with the I-th command. As stated above, all of the entities created before the execution of the I-th command need not be regenerated, and can simply be included in the resulting model, along with the newly created entities formed by the execution of the modified I-th command and all subsequent commands. Thus, in step 122, the method checks the tag entities to identify tags having an activation number less than I, and a deactivation number greater than or equal to I, and then proceeds to step 124, wherein the model is recreated with the existing entities having the tags identified in step 122. Thereafter, in step 126, commands I–T are regenerated to update the model in the manner requested by the user in the call to regeneration routine. Finally, in step 128, new tags are created for the entities created or updated by the regeneration of commands I–T.

Figure 9:
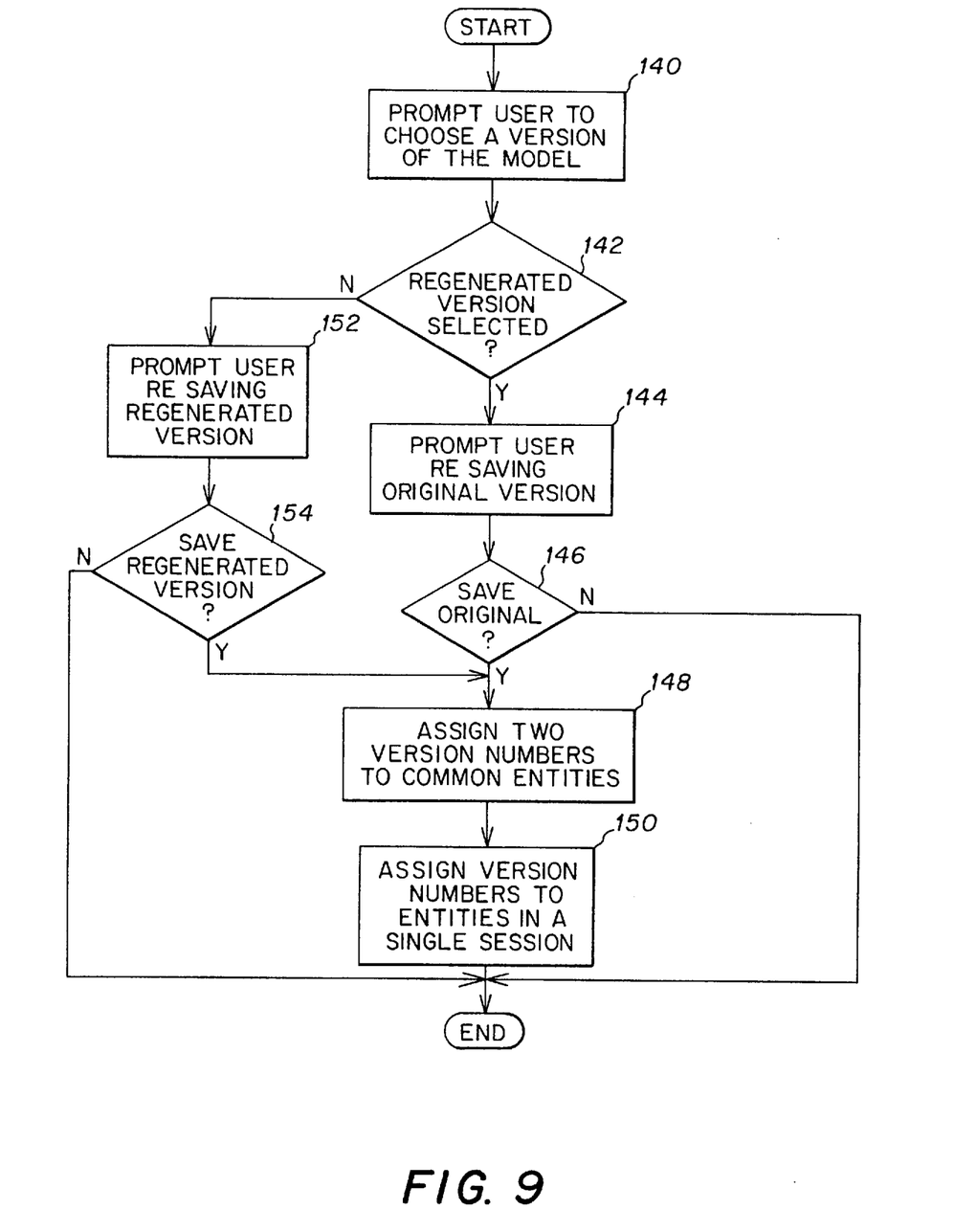
FIG. 9 is a flowchart of a versioning method according to the present invention.

Referring to FIG. 9, after a model has been regenerated, the user is prompted to accept either the regenerated version or the original version (step 140). This choice is useful because a minor dimensional change may ultimately lead to undesirable consequences in other parts of the model. Thus, the user has the option of maintaining the original version of the model.

When the regenerated model is selected (step 142), the user is prompted to decide whether to save the original version (step 144). In step 146, a determination is made as to whether the original version is to be saved, because when it is, the system may assign two different version numbers to a single entity. For example, if regeneration is begun at a command twenty, all entities that were created by commands one through nineteen and were never deactivated would be included in both the original and regenerated versions of the model. However, some of entities created by commands one through nineteen may be altered in the regenerated version. For example, in one version of the model a certain dimension (e.g., the radius of bore 32 in FIG. 3) may have one value, while in another version it may have a different value. In one embodiment of the present invention, a version number can be assigned to each version of the model, and each model entity can be identified as belonging to one or more versions.

When it is determined at step 146 that the original version is to be saved, the method proceeds to step 148, wherein all the entities that are common to both the original and regenerated versions are assigned two version numbers, indicating that those entities belong to both versions. Conversely, in step 150, the entities that differ in the original and regenerated versions are separately defined, each with a different version number indicating that those entities belong to only one version of the model. Thus, the system indicates that all of the different entities belong to either the original or regenerated versions, while all the common entities are indicated as belonging to both versions.

When it is determined at step 146 that the original version is not to be saved, separate versions for the model are not created. Therefore, the method simply terminates.

The method proceeds in a similar manner when it is determined in step 142 that the regenerated version of the model has not been selected by the user. The method proceeds to step 152, wherein the user is prompted to determine whether the regenerated version of the model should be saved. When it is determined at step 154 that the regenerated version of the model is to be saved, the method proceeds to steps 148–150, wherein each entity is provided with one or more version numbers in the manner described above. Conversely, when it is determined at step 154 that the regenerated version is not to be saved, separate versions for the model are not created and the method simply terminates.

In one embodiment of the invention, the history module 18 (FIG. 1) also saves information that indicates how many times a model and individual model entities have been regenerated. Each time the model is regenerated, this information is updated. The same information can also be obtained by counting a number of versions for the model or any particular model entity.

By providing information that relates activation and deactivation command numbers to each model entity, the CAD system of the present invention can go directly to the state of the model before a command at which a user wants to begin regeneration. While the example which has been used here is very simple, it should be understood that a model, e.g., an automobile door or transmission, may be produced from thousands of commands, and may have thousands of entities. Thus, it should be apparent that when commands having a high command sequence number are changed, the time savings over prior art systems can be very significant. In one test that has been conducted, a model was produced with seventy-seven commands. It was found that its regeneration might take as long as fifteen minutes using a typical prior art system. According to the present invention, however, regeneration was performed in as little as sixty seconds or less if one of the more recent commands is changed or undone. When command fifty was changed or undone, the savings was still more than 33%.

By providing a version field in which multiple versions of a model can be designated for each entity, a user can save multiple versions of a model without storing large quantities of repetitive data. Thus, according to the present invention, by providing activation, deactivation and version fields, a user can obtain the state of one of a number of different models at any given time, thus substantially reducing repetitive tasks.

Having described one embodiment of the present invention, it should become apparent to those skilled in the art that other features can be added or changed without departing from the scope of the invention as defined by the appended claims and their equivalents. For example, different levels of granularity can be used to represent entities in a model. While the present application is described in terms of solids which have various topological entities, such as faces, edges, and vertices, the granularity may be changed so that portions of faces and portions of edges are stored as model entities. In this case, where a hole is created in a face, portions of the face could be saved as unchanged, while other portions of the face could be modified. Furthermore, while the disclosed embodiment has been described in a three-dimensional solid context, the principals described here can also be used with two dimensional modelling, or with surface contoured shells.

What is claimed is:

1. A method for updating a first version of a model in a computer aided design (CAD) system in response to a request to regenerate the model with a modification to generate a second version of the model, the CAD system creating model entities in response to input commands, the first version of the model including a plurality of model entities created during a previously executed sequence of input commands, the request to regenerate the model identifying at least one modified input command, the at least one modified input command corresponding to an input command in the sequence that is modified to define the modification to the first version of the model, the CAD system including a computer having a database, the method including the computer implemented steps of:

(a) storing in the database the plurality of model entities of the first version of the model created by the input commands in the sequence;

(b) storing identification information for each model entity that identifies at what sequential stage in the sequence of commands the entity was included in the first version of the model;

(c) when the request to regenerate the model is received, identifying model entities that were included in the first version of the model following execution of an input command in the sequence that immediately precedes the input command corresponding to the modified input command;

(d) retrieving the identified model entities from the database to be included in the second version of the model; and (e) executing a series of commands that includes the modified input command and each input command in the sequence that follows the input command corresponding to the modified input command and excludes at least one input command in the sequence that precedes the input command corresponding to the modified input command to create additional model entities that form the second version of the model.

2. The method for updating as recited in claim 1, wherein step (c) includes reading the identification information stored in step (b) for each model entity.

3. The method for updating as recited in claim 2, wherein step (b) includes, for each one of the model entities, the steps of:

storing identification data identifying which input command in the sequence created the one of the model entities; and storing identification data identifying which input command in the sequence, if any, caused the one of the model entities to be deactivated from the first version of the model.

4. The method for updating as recited in claim 1, wherein each input command has a sequential position in the sequence, the input command that corresponds to the at least one modified input command having an I-th position in the sequence;

wherein step (b) includes, for each one of the model entities, the steps of;

storing data identifying the position of the input command in the sequence that created the one of the model entities; and storing data identifying the position of any input command in the sequence that caused the one of the model entities to be deactivated from the first version of the model; and wherein step (c) includes reading the data stored in step (b) for each model entity to identify each model entity created by an input command having a position preceding the I-th input command in the sequence, and not being deactivated from the first version of the model by an input command having a position preceding the I-th input command in the sequence.

5. The method for updating as recited in claim 1, further including a step of:

(f) storing the first and second versions of the model in the database, including a step of storing entities that belong to both the first and second versions of the model only once.

6. The method for updating as recited in claim 5, wherein step (f) further includes a step of:

storing identification data for each model entity that indicates each version of the model to which the model entity belongs.

7. The method for updating as recited in claim 1, wherein step (b) includes, for each one of the model entities, the steps of:
   storing identification data identifying which input command in the sequence created the one of the model entities; and
   storing identification data identifying which input command in the sequence, if any, caused the one of the model entities to be deactivated from the first version of the model.

8. The method for updating as recited in claim 2, further including a step of:
   (f) storing the first and second versions of the model in the database, including a step of storing entities that belong to both the first and second versions of the model only once.

9. The method for updating as recited in claim 8, wherein step (f) further includes a step of:
   storing identification data for each model entity that indicates each version of the model to which the model entity belongs.

10. The method for updating as recited in claim 3, further including a step of:
    (f) storing the first and second versions of the model in the database, including a step of storing entities that belong to both the first and second versions of the model only once.

11. The method for updating as recited in claim 10, wherein step (f) further includes a step of:
    storing identification data for each model entity that indicates each version of the model to which the model entity belongs.

12. The method for updating as recited in claim 4, further including a step of:
    (f) storing the first and second versions of the model in the database, including a step of storing entities that belong to both the first and second versions of the model only once.

13. The method for updating as recited in claim 12, wherein step (f) further includes a step of:
    storing identification data for each model entity that indicates each version of the model to which the model entity belongs.

14. A method for storing at least first and second versions of a model in a CAD system, the at least first and second versions of the model each including a plurality of model entities, at least one of the plurality of model entities being shared by the first and second versions of the model, the CAD system including a computer having a database, the method including the computer implemented steps of:
    (a) storing in the database each of the plurality of model entities included in the first version of the model;
    (b) identifying a first group of model entities that are shared by the first and second versions of the model and a second group of model entities in the second version of the model that are not shared by the first version of the model;
    (c) storing in the database each of the plurality of model entities included in the second group; and
    (d) storing in the database information identifying each of the stored model entities included in the first version of the model as belonging to the first version of the model, identifying each of the model entities in the first group as also belonging to the second version of the model, and identifying each of the model entities in the second group as belonging to the second version of the model.

15. A method for updating an original version of a model in a CAD system in response to a request to regenerate the model with a modification to generate a regenerated version of the model, the CAD system creating model entities in response to input commands, the original version of the model including a plurality of model entities created during the previous execution of a plurality of input commands received in a sequence, the request to regenerate the model identifying at least one modified input command, the at least one modified input command corresponding to an input command in the sequence that is modified to define the modification to the model, the original version of the model having a plurality of states corresponding to the plurality of input commands received in the sequence such that the original version of the model has a unique state following the execution of each of the plurality of input commands, each state of the model including at least one model entity, the CAD system including a computer having a database, the method including the computer implemented steps of:
    (a) storing in the database the plurality of model entities of the original version of the model created by the plurality of input commands in the sequence;
    (b) storing information identifying each of the plurality of states of the model;
    (c) when the request to regenerate the model is received, identifying the at least one model entity that was included in the state of the original version of the model following execution of an input command in the sequence that immediately precedes the input command corresponding to the modified input command;
    (d) retrieving the at least one model entity identified in step (c) from the database to be included in the regenerated version of the model; and
    (e) executing a series of commands that includes the modified input command and each input command in the sequence that follows the input command corresponding to the modified input command and excludes at least one input command in the sequence that precedes the input command corresponding to the modified input command to create additional model entities that form the regenerated version of the model.

16. The method for updating as recited in claim 15, further including a step of:
    (f) storing the original and regenerated versions of the model in the database, including a step of storing entities that belong to both the original and regenerated versions of the model only once.

17. The method for updating as recited in claim 16, wherein step (f) further includes a step of:
    storing identification data for each model entity that indicates each version of the model to which the model entity belongs.

18. A computer aided design (CAD) system that generates model entities in response to received input commands, the CAD system responding to a sequence of input commands to generate an original version of a model that includes a plurality of model entities, the CAD system also responding to a regenerate command to generate a regenerated version of the model, the regenerated version of the model including a plurality of model entities, the regenerate command identifying at least one modified input command that corresponds to an input command in the sequence that is modified to define a modification to the original version of the model, the CAD system including:

a database;

means for storing in the database the plurality of model entities of the original version generated in response to receipt of each input command in the sequence;

means for storing identification information in the database for each of the plurality of model entities of the original version that identifies at what stage in the sequence of commands the model entity was included in the original version of the model;

identification means, responsive to receipt of the regenerate command, for identifying model entities that were included in the original version of the model following execution of an input command in the sequence that immediately precedes the input command corresponding to the modified input command;

means, responsive to the identification means, for retrieving the identified model entities from the database;

means for executing a series of commands that includes the modified input command and each input command in the sequence that follows the input command corresponding to the modified input command and excludes at least one input command in the sequence that precedes the input command corresponding to the modified input command to create regenerated model entities; and means for combining the retrieved model entities and the regenerated model entities to generate the regenerated version of the model.

19. The CAD system of claim 18, wherein the means for storing identification information includes:

means for storing identification data for each one of the plurality of model entities of the original version that identifies which input command in the sequence created the one of the plurality of model entities; and means for storing identification data for each one of the plurality of model entities of the original version that identifies which input command in the sequence, if any, caused the one of the plurality of model entities to be deactivated from the original version of the model.

20. The CAD system of claim 18, further including means for storing the original and regenerated versions of the model in the database, including means for storing model entities that belong to both the original and regenerated versions of the model only once.

21. The CAD system of claim 20, further including means for storing identification data for each model entity that indicates each version of the model to which the model entity belongs.

22. A computer aided design (CAD) system that generates model entities in response to received input commands, the CAD system responding to input commands to generate an original version of a model that includes a plurality of model entities, the CAD system also responding to a regenerate command to generate a regenerated version of the model that also includes a plurality of model entities, the CAD system including:

a database;

means for storing in the database each of the plurality of model entities included in the first version of the model;

means for identifying a first group of model entities that are shared by the original and regenerated versions of the model and a second group of model entities in the regenerated version of the model that are not shared by the original version of the model;

means for storing in the database each of the plurality of model entities included in the second group; and means for storing in the database information identifying each of the model entities included in the original version of the model as corresponding to the original version of the model, identifying each of the model entities in the first group as also corresponding to the regenerated version of the model, and identifying each of the model entities in the second group as corresponding to the regenerated version of the model.

23. A computer readable medium encoded with a computer program for updating a first version of a model in a computer aided design (CAD) system in response to a request to regenerate the model with a modification to generate a second version of the model, the CAD system creating model entities in response to input commands, the first version of the model including a plurality of model entities created during a previously executed sequence of input commands, the request to regenerate the model identifying at least one modified input command, the at least one modified input command corresponding to an input command in the sequence that is modified to define the modification to the first version of the model, the CAD system including a computer having a database, the computer program, when executed by the computer, causing the computer to perform the steps of:

(a) storing in the database the plurality of model entities of the first version of the model created by the input commands in the sequence;

(b) storing identification information for each model entity that identifies at what sequential stage in the sequence of commands the entity was included in the first version of the model;

(c) when the request to regenerate the model is received, identifying model entities that were included in the first version of the model following execution of an input command in the sequence that immediately precedes the input command corresponding to the modified input command;

(d) retrieving the identified model entities from the database to be included in the second version of the model; and (e) executing a series of commands that includes the modified input command and each input command in the sequence that follows the input command corresponding to the modified input command and excludes at least one input command in the sequence the precedes the input command corresponding to the modified input command to create additional model entities that form the second version of the model.

* * * * *